(12) United States Patent
Ueyoko et al.

(10) Patent No.: US 9,199,512 B2
(45) Date of Patent: Dec. 1, 2015

(54) PNEUMATIC TIRE WITH GEODESIC BELT

(71) Applicant: The Goodyear Tire & Rubber Company, Akron, OH (US)

(72) Inventors: Kiyoshi Ueyoko, Copley, OH (US); Luis Antonio Cabrera, Hartville, OH (US); Loyda Mercedes Yerashunas, North Canton, OH (US); John Joseph Slivka, Danville, VA (US); James Michael Hart, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 283 days.

(21) Appl. No.: 13/793,104

(22) Filed: Mar. 11, 2013

(65) Prior Publication Data

US 2014/0174625 A1    Jun. 26, 2014

Related U.S. Application Data

(60) Provisional application No. 61/740,204, filed on Dec. 20, 2012.

(51) Int. Cl.
| | |
|---|---|
| *B60C 9/18* | (2006.01) |
| *B60C 9/22* | (2006.01) |
| *B60C 9/26* | (2006.01) |
| *B60C 9/28* | (2006.01) |
| *B60C 9/20* | (2006.01) |

(52) U.S. Cl.
CPC ............... *B60C 9/28* (2013.01); *B60C 9/2009* (2013.04); *B60C 2009/2025* (2013.04); *B60C 2009/2032* (2013.04); *B60C 2200/02* (2013.04); *Y10T 152/1081* (2015.01); *Y10T 152/10765* (2015.01)

(58) Field of Classification Search
CPC .............. B60C 9/18; B60C 9/20; B60C 9/22; B60C 9/28; B29D 2030/082; B29D 30/30; B29D 30/70
See application file for complete search history.

(56) References Cited

U.S. PATENT DOCUMENTS 3,002,874 A * 10/1961 Lowe ............................ 156/397
3,024,828 A    3/1962 Smith et al.
3,973,612 A *  8/1976 Mezzanotte ................. 152/529

FOREIGN PATENT DOCUMENTS

| EP | 511797 | * 11/1992 |
| FR | 2619533 | * 2/1989 |
| GB | 810425 A | 3/1959 |
| SU | 1717407 | * 3/1992 |

OTHER PUBLICATIONS

Machine translation of FR 2619533, 1989.*
Machine translation of SU 1717407, 1992.*

* cited by examiner

*Primary Examiner* — Justin Fischer
(74) *Attorney, Agent, or Firm* — June E. Rickey

(57) ABSTRACT

A tire having a modified geodesic belt is described. The ideal geodesic belt path is modified to select the centerline belt angle and to avoid excessive build up of the belt at the belt edges. The method includes the step of calculating the minimum three dimensional distance from one belt edge to the other belt edge preferably using dynamic successive approximation.

16 Claims, 8 Drawing Sheets

PNEUMATIC TIRE WITH GEODESIC BELT

FIELD OF THE INVENTION

The invention is directed to the field of tire manufacturing and tire construction.

BACKGROUND OF THE INVENTION

It is known in the art to utilize zigzag belts in aircraft tires and truck tires. Zigzag belts are typically continuously woven from one belt edge to the other belt edge at a constant angle, with a turn around at the belt edges. A zigzag belt results in two layers of cord interwoven together with no cut belt edges. However, depending upon the tire size and other factors, the angle of the zigzag belt in the crown area is typically 10-14 degrees, with the turnaround angle at the belt edges typically around 90 degrees. It is however desired to have a higher angle at the centerline in order to improve wear, typically in the range of 15-45 degrees.

A geodesic belt construction has the belt cords arranged on a geodesic line on the tire's curved surface. On a curved surface the geodesic path is the least curvature or shortest distance between two points on a curved surface. A true geodesic path follows the special mathematical law: $p\cos\alpha = \text{constant}$. A true geodesic belt has the advantage of a higher crown angle at the centerline as compared to the zigzag belt. The true geodesic belt also has the advantage of no shear stress, because it is the minimum path. Unlike the zigzag belt construction, the geodesic belt angle continuously varies such that the angle is high at the centerline, typically around 45 degrees, and is 180 degrees at the belt edges. Both the zigzag belt and the geodesic belt have an issue at the belt edges of accumulation. It is thus desired to provide an improved belt design which modifies the geodesic path to overcome the disadvantages of the geodesic belt. Thus for the foregoing reasons, it is desired to provide an tire having a belt with a modified geodesic path without the above described disadvantages.

DEFINITIONS

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" means the same as belt or belt structure or reinforcement belts.

"Carcass" means a layer of tire ply material and other tire components. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated cords.

"Radial" and "radially" mean directions radially toward or away from the axis of rotation of the tire.

"Sidewall" means a portion of a tire between the tread and the bead.

"Laminate structure" means an unvulcanized structure made of one or more layers of tire or elastomer components such as the innerliner, sidewalls, and optional ply layer.

BRIEF DESCRIPTION OF THE DRAWINGS

The invention will be described by way of example and with reference to the accompanying drawings in which.

DETAILED DESCRIPTION OF THE INVENTION

Figure 1:
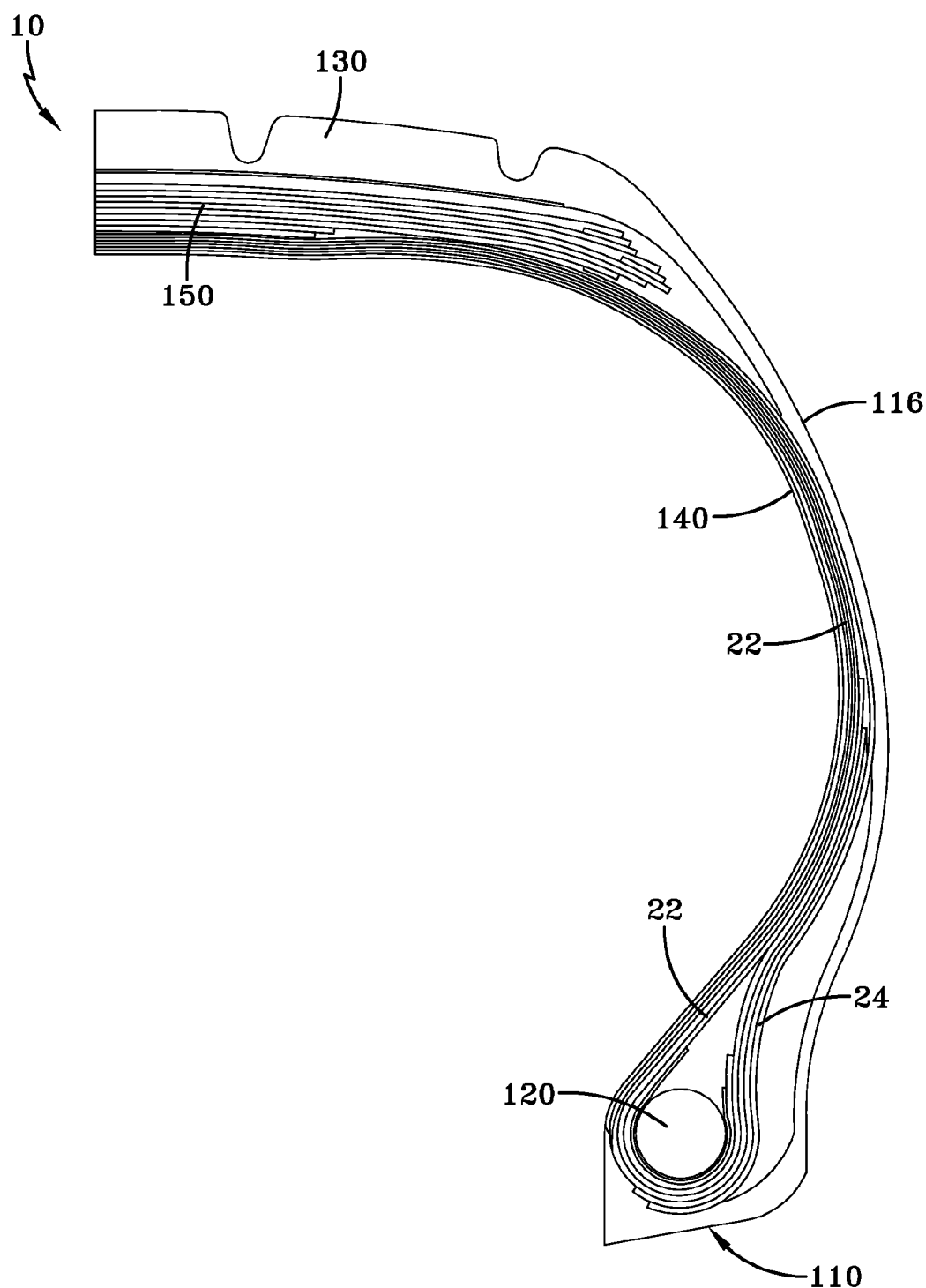
FIG. 1 is a cross-sectional view of one half of a symmetrical aircraft tire.

FIG. 1 illustrates a cross-sectional view of one half of a radial aircraft tire 10 of the present invention. The tire is symmetrical about the mid-circumferential plane so that only one half is illustrated. As shown, the aircraft tire comprises a pair of bead portions 110 each containing a bead core 120 embedded therein. One example of a bead core suitable for use in an aircraft tire is shown in U.S. Pat. No. 6,571,847. The bead core 120 preferably has an aluminum, aluminum alloy or other light weight alloy in the center portion surrounded by a plurality of steel sheath wires (not shown). A person skilled in the art may appreciate that other bead cores may also be utilized.

The aircraft tire further comprises a sidewall portion 116 extending substantially outward from each of the bead portions 110 in the radial direction of the tire, and a tread portion 130 extending between the radially outer ends of the sidewall portions 116. Furthermore, the tire 10 is reinforced with a carcass 22 toroidally extending from one of the bead portions 12 to the other bead portion 12. The carcass 22 is comprised of inner carcass plies 22 and outer carcass plies 24, preferably oriented in the radial direction. Among these carcass plies, typically four inner plies 22 are wound around the bead core 120 from inside of the tire toward outside thereof to form turnup portions, while typically two outer plies 24 are extended downward to the bead core 120 along the outside of the turnup portion of the inner carcass ply 22. Each of these carcass plies 22,24 may comprise any suitable cord, typically nylon cords such as nylon-6,6 cords extending substantially perpendicular to an equatorial plane EP of the tire (i.e., extending in the radial direction of the tire). Preferably the nylon cords have an 1890 denier/2/2 or 1890 denier/3 construction. One or more of the carcass plies 22, 24 may also comprise an aramid and nylon cord structure, for example, a hybrid cord, a high energy cord or a merged cord. Examples of suitable cords are described in U.S. Pat. No. 4,893,665, U.S. Pat. No. 4,155,394 or U.S. Pat. No. 6,799,618.

Figure 8:
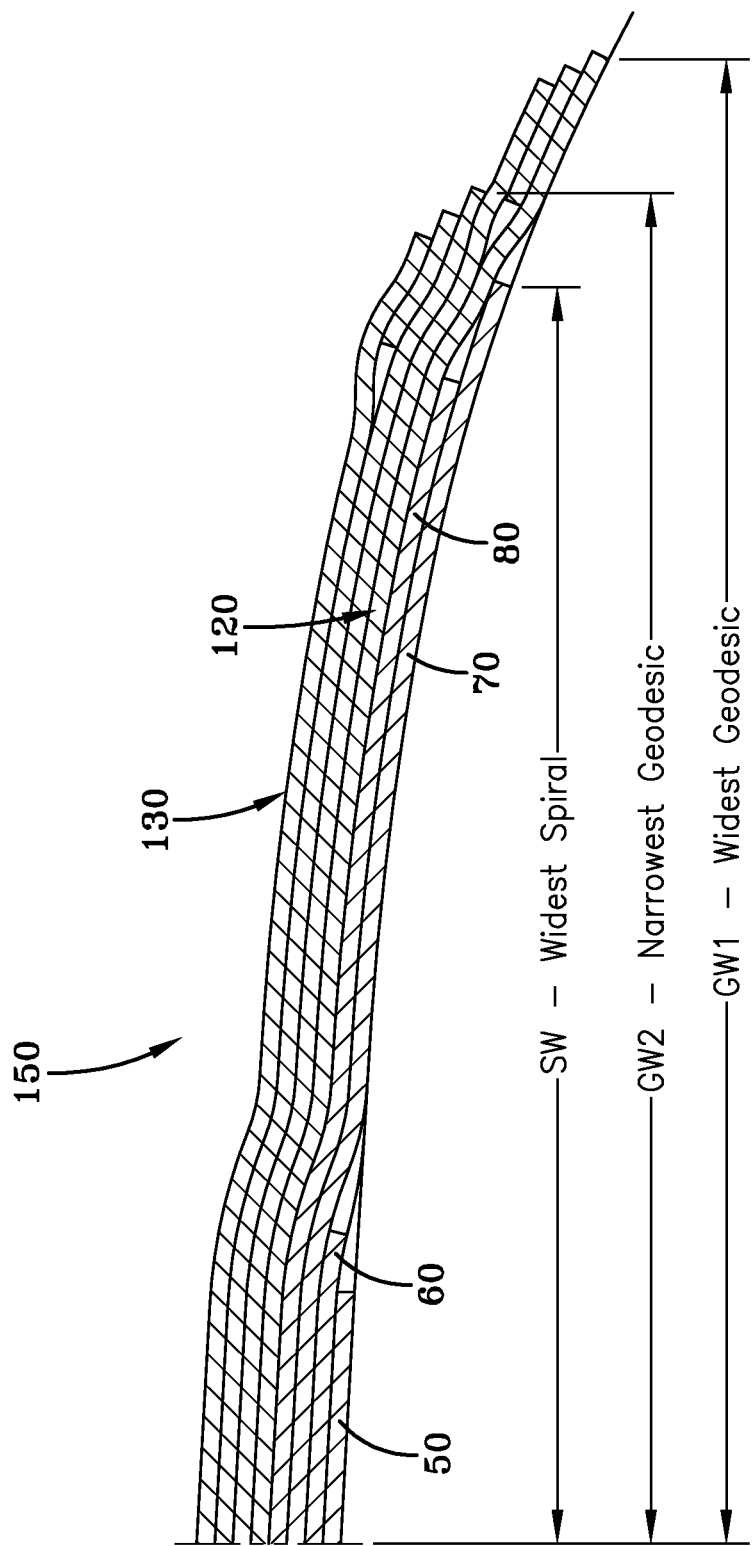
FIG. 8 is a cross-sectional view of one half of a symmetrical belt package.

The aircraft tire 10 further comprises a belt package 150 arranged between the carcass 22 and the tread rubber 130. FIG. 8 illustrates a first embodiment of one half of a belt package 150 suitable for use in the aircraft tire. The belt package 150 is symmetrical about the mid-circumferential plane so that only one half of the belt package is illustrated. The belt package 150 as shown comprises a first belt layer 50 located adjacent the carcass. The first belt layer 50 is preferably formed of cords having an angle of 5 degrees or less with respect to the mid-circumferential plane. Preferably, the first belt layer 50 is formed of a rubberized strip 43 of two or more cords made by spirally or helically winding the cords at an angle of plus or minus 5 degrees or less relative to the circumferential direction. The first belt layer 50 is the narrowest belt structure of the belt package 150, and has a width in the range of about 13% to about 100% of the rim width (width between flanges), and more particularly in the range of about 20% to about 70% of the rim width (width between flanges), and most particularly in the range of about 30% to about 42% of the rim width (width between flanges).

The belt package 150 further comprises a second belt layer 60 located radially outward of the first belt layer 50. The second belt layer 60 is preferably formed of cords having an angle of 5 degrees or less with respect to the mid-circumferential plane. Preferably, the second belt layer 60 is formed of a rubberized strip 43 of two or more cords made by spirally or helically winding the cords at an angle of plus or minus 5 degrees or less relative to the circumferential direction. The first belt 100 is the radially innermost belt, and has a width $Bw_s$. The first belt 50 is the narrowest belt of all the belts. The second belt 60 is located radially outward of the first belt, and has a slightly larger width than the first belt. The embodiment further includes a third 70 and fourth belt 80, having a low angle of 5 degrees or less with respect to the circumferential plane. The third and fourth belts are preferably helically wound. The third belt 110 is located radially outward of the second belt, and is substantially wider than the first and second belts. The third belt has a width bw3 and is the widest belts of the first, second and fourth belts 50, 60, 80. The fourth belt 80 is located radially outward of the third belt, and is the widest of the low angle belts. The fourth belt has a width slightly less than the third belt. The embodiment further includes a first 120 and second 130 modified geodesic belt structure that are both located radially outward of the first through fourth belts. The first geodesic belt 120 is located radially outward of the fourth belt 80, and has the widest width BwZ of all of the belts 50,60,70,80,130. The ratio of the geodesic belt width BWg to the narrowest cut belt Bws is as follows:

$$0.3 < BWs/BWg < 0.6, \text{ and more preferably in the range of } 0.3 < BWs/BWg < 0.5 \quad (1)$$

In the above embodiment, it is additionally preferred that the ply be made of nylon and that the belt be made of an aramid/nylon blend, such that the ply cord % elongation is greater than the belt cord % elongation at break. It is additionally preferred that the maximum belt cord elongation at break be less than 18%.

Figure 2:
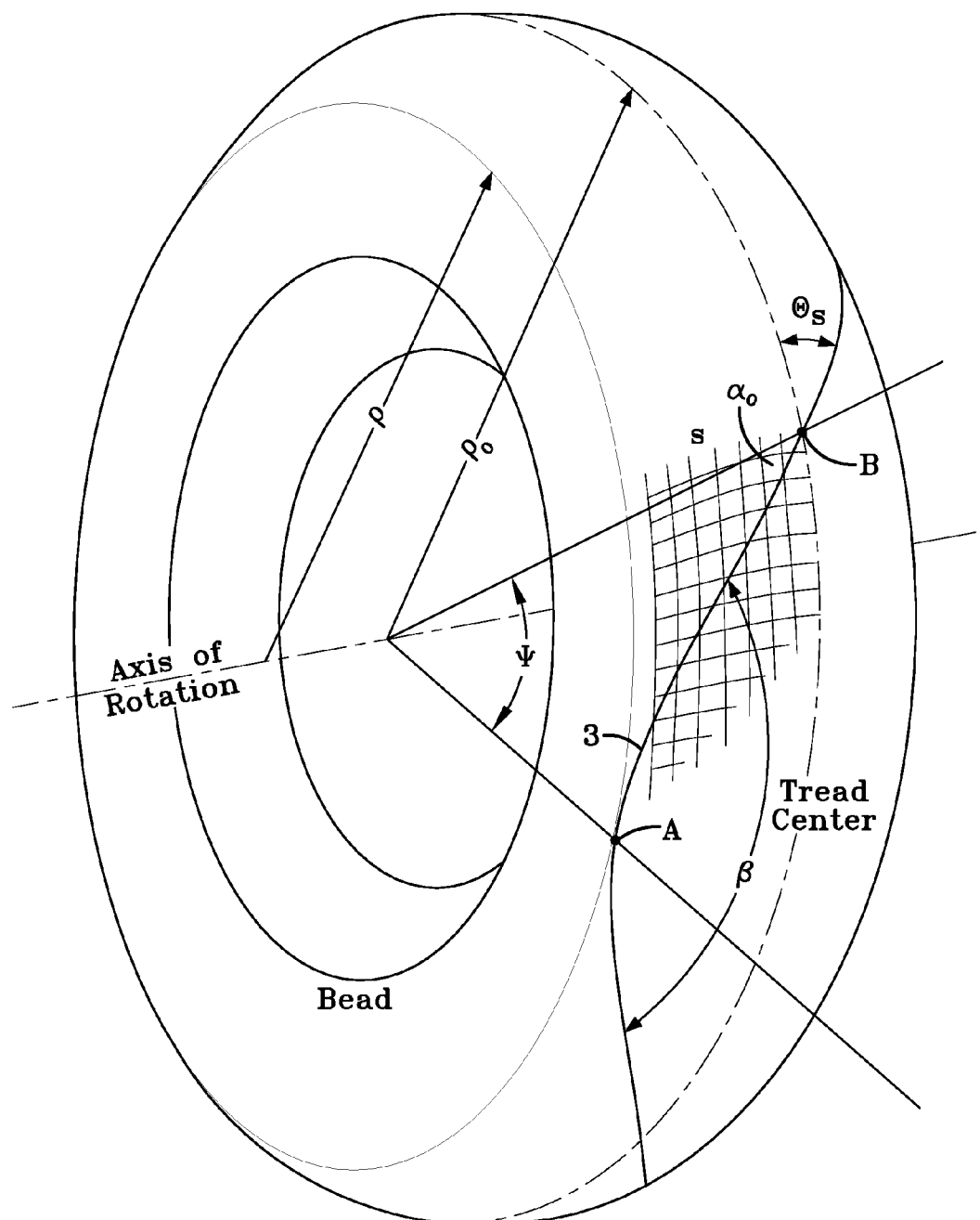
FIG. 2 is a perspective view of a tire illustrating an ideal geodesic line 3 on the outer surface.

The belt package has at least one modified geodesic belts made as described in more detail, below. It is helpful to understand that a true geodesic line on a curved surface is the shortest 3 dimensional distance between two points in space or the least curvature. FIG. 2 illustrates line 3 which illustrates a belt having a true geodesic line. Note that the cord is tangent to the belt edge at point A. A true geodesic ply pattern follows the mathematical equation exactly: $\rho \cos \alpha = \rho_0 \cos \alpha_0$, wherein $\rho$ is the radial distance from the axis of rotation to the cord at a given location; $\alpha$ is the angle of the cord at a given location with respect to the mid-circumferential plane; and $\rho$ is the radial distance from the axis of rotation of the core to the crown, and $\rho_0$, $\alpha_0$ is the radius and angle at the midcircumferential plane.

Figure 3A:
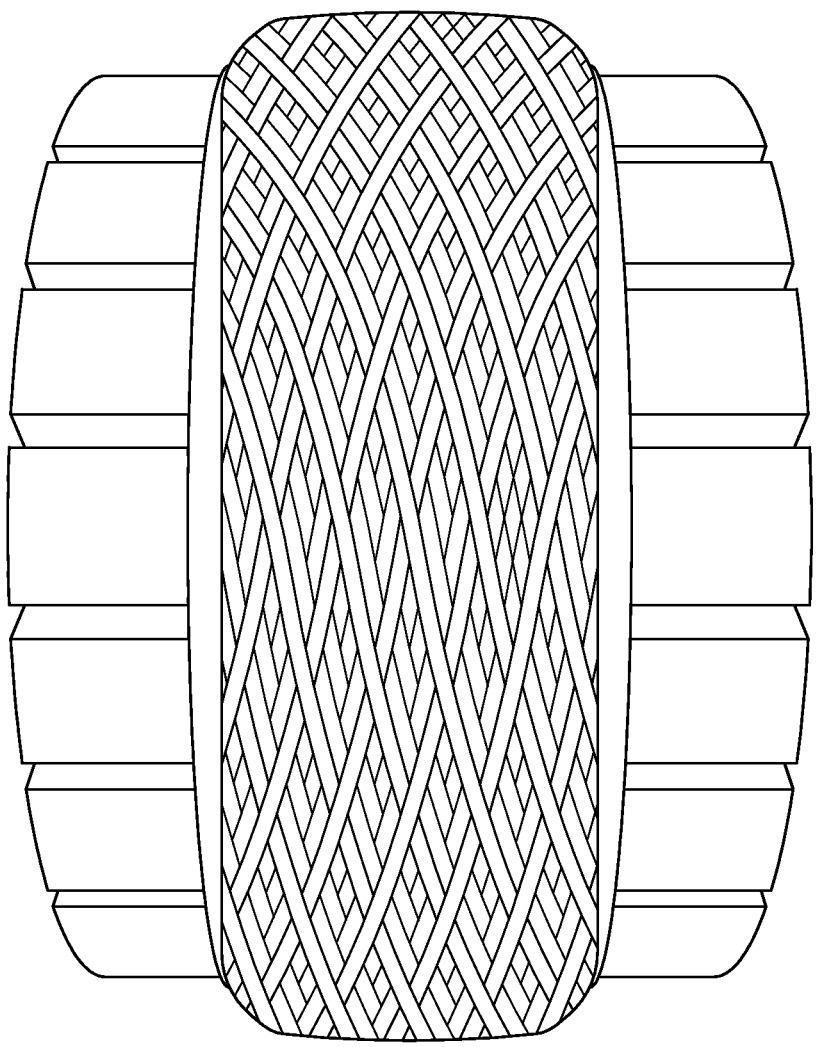
FIGS. 3a, 3b are front views of a tire with a modified geodesic belt.
Figure 3B:
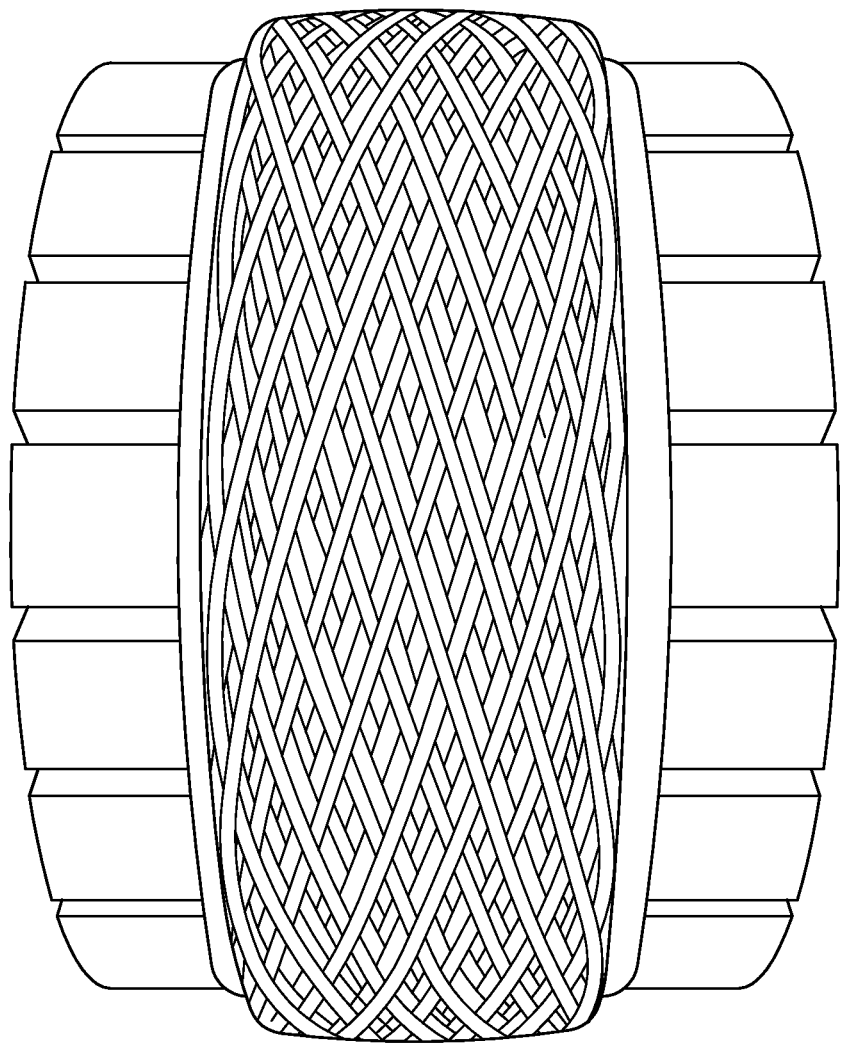

FIGS. 3a and 3b each illustrate a front view of a tire on a belt making machine constructed with a modified geodesic belt 120,130 of the present invention. The angle of the belt at the edges is slightly less than 180 degrees. Each belt looks different due to the selection of different parameters such as desired centerline angle θs. The geodesic belt is applied using a belt applier on a rotating B&T drum. The belt applier utilizes a mechanical arm applier (not shown) that translates in an axial direction from one belt edge shoulder to the other belt edge shoulder. A computer controller controls the arm position (x axis) coordinated with the speed of the B&T drum (ψ). The modified geodesic belt path 120,130 is determined from the following steps.

Figure 4:
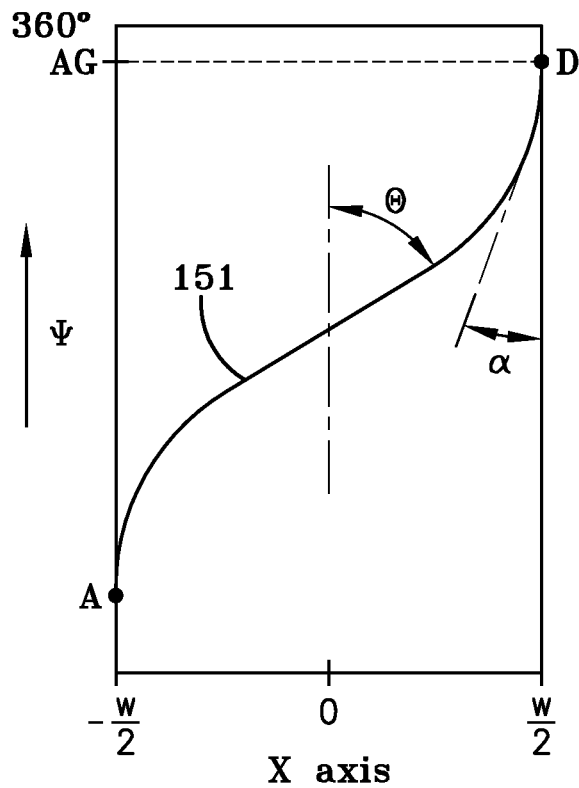
FIG. 4 is a schematic view of a modified geoline from $\psi=0$ to $\psi=360$ degrees.
Figure 7:
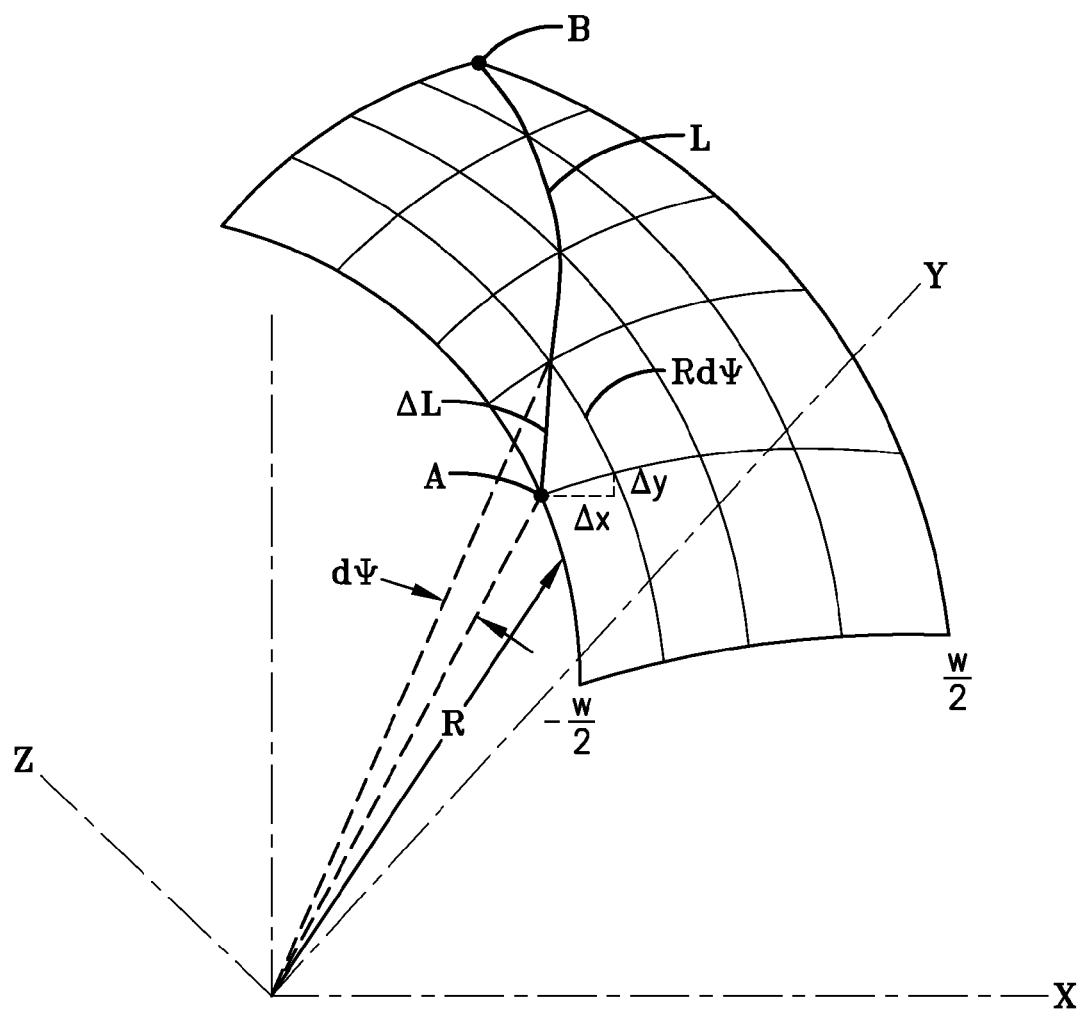
FIG. 7 illustrates the minimum path L in rectangular coordinates.

FIGS. 4 and 7 illustrates a modified geodesic path 151 according to the teachings of the invention. FIG. 4 illustrates the path for 1 revolution from 0 degrees to Phi=360 degrees. For a true geodesic path, at each belt edge (W/2) the angle α=0 degrees so that the cord is tangent at the belt edge. The modified geodesic path of the invention deviates from an angle of zero at the belt edges in order to avoid excessive build up at the belt edges. The modified geodesic path also deviates from the angle at the centerline, so that a desired centerline angle θs may be obtained. For purposes of illustration, for an exemplary tire size, it is known that there are 20 geolines formed in 9 revolutions. Thus a geoline is formed in 0.45 revolutions for a true geodesic path. At each belt edge, the geoline is tangent to the belt edges (α=0), and the belt angle at the centerline is about 15.5 degrees. A geoline is defined as the three dimensional minimum path from one belt edge (point A on FIG. 4) to the opposite belt edge (point D, FIG. 4). Thus a belt would require multiple geolines in order to completely cover the tire belt surface, typically 80 geolines.

Figure 5:
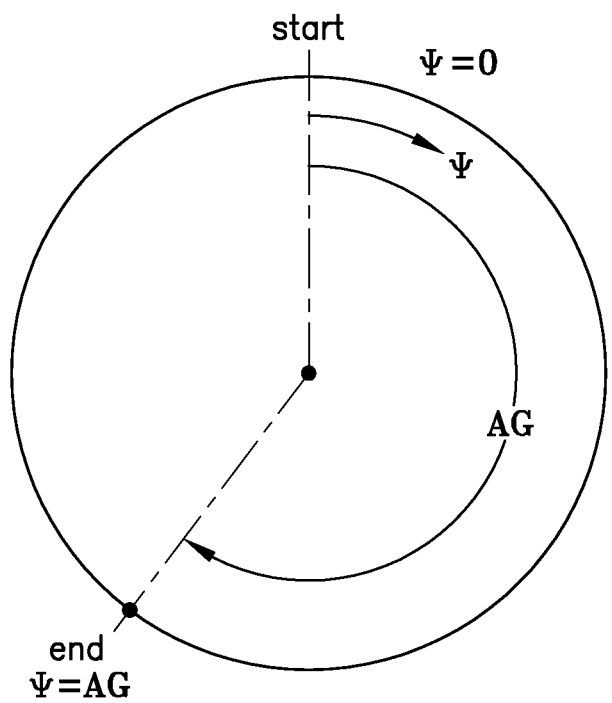
FIG. 5 is a side view simplified schematic of a tire building drum illustrating angle of drum rotation: $\psi=0$ to $\psi=AG$.
Figure 6:
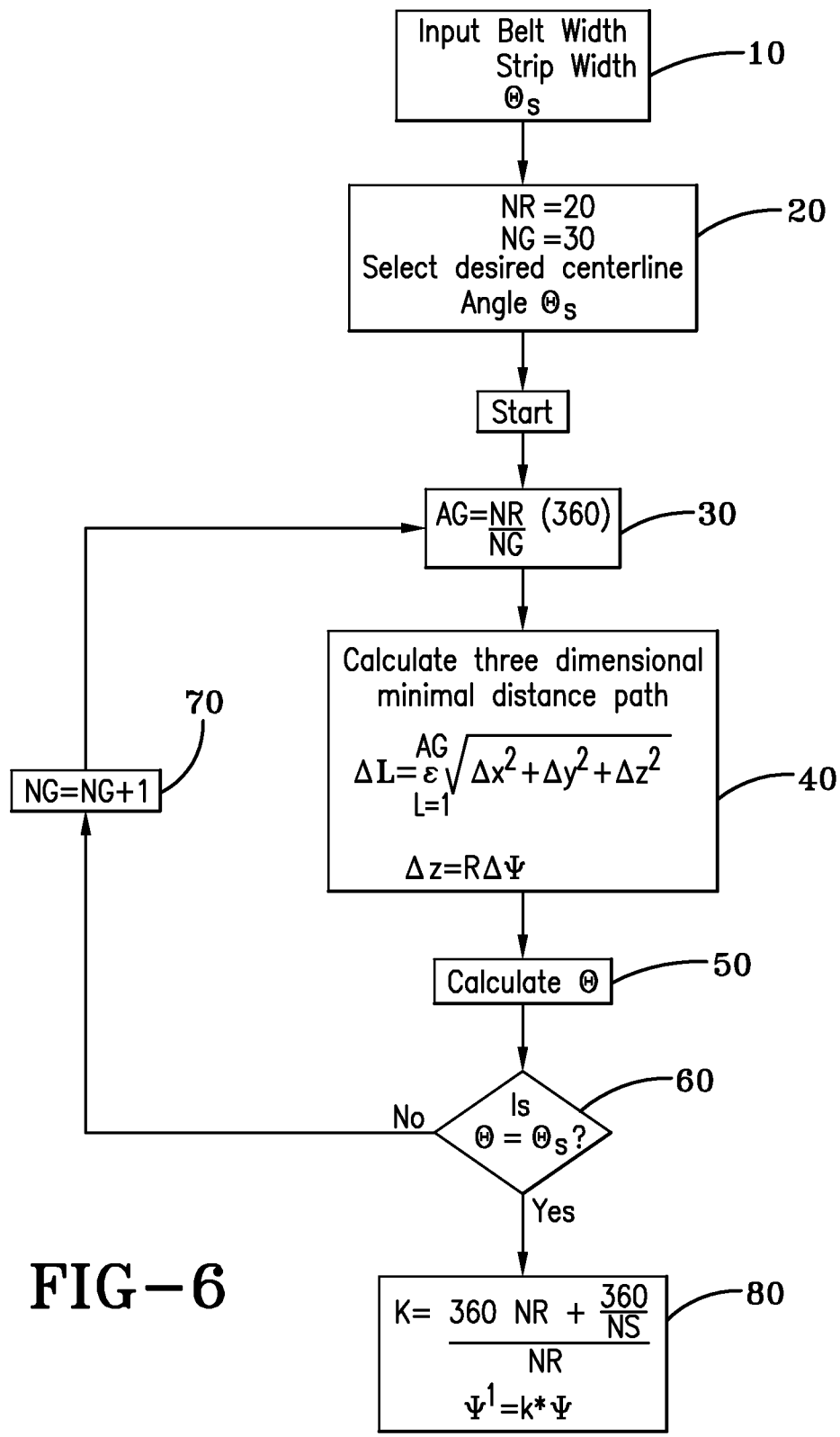
FIG. 6 is a process flow chart showing method steps of invention.

AG is defined as the change in angle ψ from the starting point A to the ending point D of the geoline as shown in FIG. 5. AG is set to have an initial value by specifying an initial NR value of 20, and an NG value of 30. The value of NG, AG will change as the iterative series of calculations are performed.

$$AG=360*NR/NG,$$

Where NR=number of revolutions to form NG geolines
NG=number of geolines in the set, all sets are equal FIG. 6 illustrates the flow chart for outlining the steps to calculate a modified geoline 150 for a belt. For step 10, the belt width, strip width and desired centerline angle θs are input. For step 20, θs is set to the input value θs, and NR is set to 20, NG is set to 30. These values were determined from experience.

Where NR=number of revolutions in one set of geolines
NG=number of geolines in a set that have a starting point and ending point of zero degrees phi For step 30, AG is determined from the following calculation:

$$AG = 360 * NR/NG,$$

In step 40, the three dimensional minimum distance path L is determined for a geoline from the equation below, over the range from, X=−W/2 to W/2, phi=0 to AG $$L = \sigma(SQRT(X^2+Y^2+Z^2)), \text{ for } i=1 \text{ to } k$$

Where $Z = R*\delta\psi$

In step 50, the angle θ is calculated at the centerline and compared with the input value θs. For step 60, if θ=θs? is not true, then step 70 is performed wherein NG is increased by the following formula:

$$NG = NG + \Delta NG$$

Steps 30-70 are repeated until θ=θs.

Once θ=θs, then the remaining geolines for the set are determined using equations from step 40. Alternatively, once a geoline is calculated, the other remaining geolines can be determined by adding AG to the Phi values of the geoline data set.

A first data set is now known, wherein NR=20, and NG=70 was determined in this example. The first set of data points describing the minimal path are known in X, Y, Ψ coordinates. In order to fill the belt surface sufficiently, several sets are needed, typically in the range of 2 to 5 sets. Assume in this example four data sets are needed. In order to determine the starting point of sets two through four, the value K is computed from the equation below.

For four data sets, the first data set is preferably modified by a factor K in order to completely cover the belt area by the cords and to ensure that the second data set begins where the first data set ends. For four specified data sets, the ending point of the first data set will occur precisely at Ψ=90 degrees. Thus our first data set will start at Phi=0 and end at Phi=90 degrees. Set two will start at 90 degrees and end at 180 degrees. Set three will start at 180 degrees and end at 270 degrees. Set four will start at 270 degrees and end at 0/360 degrees.

$$K = [360*NR + 360/NS])/NR$$

Where NS is number of data sets to be generated, in the example 4

In order to fill the belt, it is desired to have at least 4 data sets generated.

For the first data set, Ψ'=K*Ψ

Thus, the first data set has 70 geolines formed in 20 revolutions, wherein the data set begins at Ψ=0 and ends at Ψ=90. K is a multiplier which slightly stretches the data set to end precisely at an even interval such as 90 degrees. The second data set begins at Ψ=90 and ends at Ψ=180. This data set can be derived from the first data set by adding Ψ=Ψ+90, while the other data values stay the same. The third data set begins at Ψ=180 and ends at Ψ=270 degrees. This data set can be derived from the first data set by adding Ψ=Ψ+180, while the other data values stay the same. The fourth data set begins at Ψ=270 degrees and ends at Ψ=360 degrees. This data set can be derived from the first data set by adding Ψ=Ψ+270, while the other data values stay the same.

Cord Construction

The cord may comprise one or more rubber coated cords which may be polyester, nylon, rayon, steel, flexten or aramid.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire having a carcass and a belt reinforcing structure, the belt reinforcing structure comprising:
a first belt layer having cords arranged at an angle of 5 degrees or less with respect to the midcircumferential plane, and a second belt layer formed of a plurality of geolines joined together, each geoline extending between a first belt edge and a second belt edge, wherein each geoline is tangent to the first belt edge and the second belt edge, and is formed in a three dimensional minimum path, wherein each geoline is formed by calculating a three dimensional minimal distance path L from one belt edge to the other belt edge using the following equation: $L=\Sigma(SQRT(X^2+Y^2+Z^2))$, for $\psi=0$ to AG, Where $Z=R*\delta\psi$,
wherein the second belt layer is wider than the first belt layer and is located radially outward of the first belt layer.

2. The pneumatic tire of claim 1 wherein the angle at the centerline of is set to a desired value, and the three dimensional minimal distance path L from one belt edge to the other belt edge is determined using the following equation: $L=\Sigma(SQRT(X^2+V+Z^2))$, for $\psi=0$ to AG, Where $Z=R*\delta\psi$.

3. The tire of claim 1 wherein the second belt layer is formed from a continuous strip.

4. The tire of claim 1 wherein the second belt layer is formed from a nylon/aramid strip material.

5. The tire of claim 1 wherein the second belt layer is formed from a nylon material.

6. The tire of claim 1 wherein the second belt layer is formed from an aramid material.

7. The pneumatic tire of claim 1 wherein at least one of the first and second belt layers has cords having a percent elongation at break lesser than about 24%, and a break strength greater than about 400N.

8. The pneumatic tire of claim 1 wherein one or more of the carcass plies comprise cords made of a nylon.

9. The pneumatic tire of claim 1 wherein the carcass ply cords have greater elongation at break than the cords of at least one of the first or second belt layers.

10. The pneumatic tire of claim 1 having a third_belt layer having cords arranged at an angle of 5 degrees or less with respect to the midcircumferential plane.

11. The pneumatic tire of claim 10 wherein the third belt layer is wider than the first belt layer.

12. The pneumatic tire of claim 1 wherein the third belt layer is radially inward of the first belt layer.

13. The pneumatic tire of claim 1 wherein the second belt layer is the widest belt layer.

14. The pneumatic tire of claim 1 wherein the second belt layer is the radially outermost belt.

15. The pneumatic tire of claim 1 wherein the second belt layer has a centerline angle that is selected to be in the range of 15-30 degrees.

16. A pneumatic tire having a carcass and a belt reinforcing structure, the belt reinforcing structure comprising:

a belt layer formed of a plurality of geolines joined together, each geoline extending between a first belt edge and a second belt edge, wherein each geoline is tangent to the first belt edge and the second belt edge, and is formed in a three dimensional minimum path, wherein each geoline is formed by calculating a three dimensional minimal distance path L from one belt edge to the other belt edge using the following equation: $L=\Sigma(SQRT(X^2+Y^2+Z^2))$, for $\psi=0$ to AG, Where $Z=R*\delta\psi$.

* * * * *